United States Patent [19]

Tokuno

[11] 4,244,765
[45] Jan. 13, 1981

[54] METHOD FOR MANUFACTURING A RESIN-REINFORCED CARBON FIBER PRODUCT

[76] Inventor: Tomotoshi Tokuno, 15-20, Shingashi 1-Chome, Itabashi-Ku, Tokyo, Japan

[21] Appl. No.: 919,696

[22] Filed: Jun. 27, 1978

[51] Int. Cl.³ .............................................. B29H 9/02
[52] U.S. Cl. .................................. 156/180; 156/289; 264/137; 264/316
[58] Field of Search ............... 264/137, 316, 317, 264, 264/245; 156/180, 289

[56] References Cited

U.S. PATENT DOCUMENTS

| | | | |
|---|---|---|---|
| 2,526,945 | 10/1950 | Gray | 264/137 |
| 2,596,162 | 5/1952 | Muskat | 264/137 |
| 2,625,498 | 1/1953 | Koch | 264/174 |
| 2,721,820 | 10/1955 | Reis et al. | 264/174 |
| 3,608,052 | 9/1971 | Gunn | 264/137 |
| 3,881,977 | 5/1975 | Danksgs | 264/137 |
| 4,003,773 | 1/1977 | Grable | 156/180 |

FOREIGN PATENT DOCUMENTS

| | | | |
|---|---|---|---|
| 45-23431 | 8/1970 | Japan | 264/137 |
| 48-33270 | 10/1973 | Japan | 264/137 |
| 50-30965 | 3/1975 | Japan | 264/137 |

*Primary Examiner*—Jay H. Woo
*Attorney, Agent, or Firm*—Wenderoth, Lind & Ponack

[57] ABSTRACT

A method for manufacturing a resin-reinforced carbon fiber bar product in which thermal setting resin-impregnated carbon fibers are heated to a temperature sufficient to set the resin to semi-solid state, the heated carbon fibers are passed through resilient constriction means to form a bar-like intermediate product, the bar-like intermediate product is cooled, a tape of water-containing cellophane is wound about the intermediate bar-like product in a spiral manner to compress the carbon fibers together, the intermediate bar-like product is pulled in the longitudinal direction while being heated, the thus treated intermediate bar-like product is cooled and the cellophane tape is removed from the intermediate bar-like product to thereby form a complete resin-reinforced bar product.

11 Claims, 4 Drawing Figures

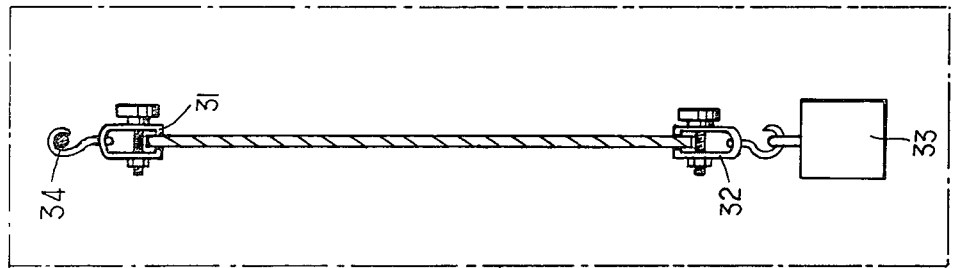
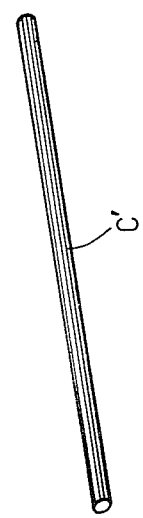
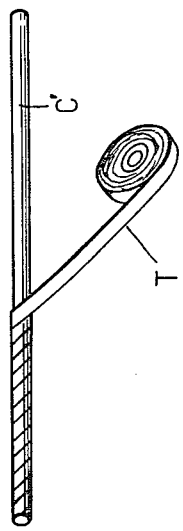
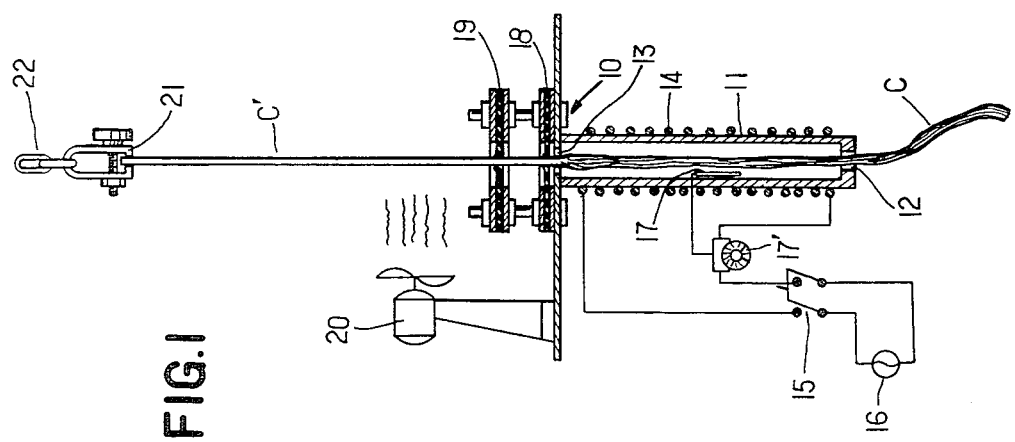

METHOD FOR MANUFACTURING A RESIN-REINFORCED CARBON FIBER PRODUCT

BACKGROUND OF THE INVENTION

This invention relates to a method for manufacturing a resin-reinforced carbon fiber bar product and more particularly, to a method for manufacturing a resin-reinforced carbon fiber bar product which is suitably employed as the material for a fishing rod or alternatively as an antenna pole or a mechanical support for supporting light weight mechanical parts.

Since it has been known that carbon fiber is quite tough and light weight, many attempts have been made for the purpose to obtain a tough plastic bar product employing carbon fibers, but unfortunately, such prior attempts have ended in failure. Although carbon fiber has properties similar to those of glass fiber, the method found suitable for the manufacture of a glass fiber bar product has encountered difficulty in the application to the manufacture of a carbon fiber bar product. The reason is that for the manufacture of glass fiber bar products, although polyester or epoxy resins are generally employed as the materials for reinforcing glass fiber bar products, but for the purpose, only such resins which can be rendered to a liquid state having a high fluidity at room temperature (15°–35° C.) and set at room temperature or at lower temperatures. When such resins are employed together with carbon fibers in the manufacture of a bar product, the resins have the following disadvantages, that is, the resins encounter difficulty in uniform distribution of the resins in carbon fibers and when a bar product is manufactured by manually impregnating the carbon fibers with the resins by the polyester resin-reinforced carbon fiber bar production method, the obtained resin-reinforced carbon fabric bar product is very low in strength. This low strength of the obtained carbon fabric bar product is considered due to the inherent properties of the carbon fibers themselves. Therefore, as resins useful in the manufacture of a resin-reinforced carbon bar product, only epoxy resins having high viscosity and high thermal melting and setting properties can be employed. Such epoxy resins are similar to phenol resins in properties and when such epoxy resins are contained in carbon fibers, methyl ethyl ketone is employed as the solvent for such resins and when phenol resins are contained in the carbon fibers, methyl alcohol is employed as the solvent for such resins. After the impregnation of the carbon fibers with the resins, it is necessary that the solvent employed is evaporated and then the resin-impregnated carbon fibers are shaped. The epoxy or phenol resin-impregnated carbon fibers have a higher viscosity than that of the fluidal epoxy resin-impregnated carbon fibers.

As one example of the products formed of resin-impregnated carbon fibers, there is a hollow glass-phenol fishing rod material is known. In the manufacture of such fishing rod material, it is necessary that glass fibers are compressed by a roll which imparts high compression pressure to the glass fibers to a bar-like intermediate product, a tape of cellophane is tightly wound about the intermediate bar-like product and the tape wound intermediate bar product is set by applying heat thereto. However, since the hollow fishing rod has no iron core therein, the hollow fishing rod may be easily drformed or damaged while the rod is being rolled. In addition, the cellophane tape can not be wound about the compressed glass fibers with a sufficiently high tightness. And in the manufacture of a polyester fishing rod, the polyester-impregnated carbon fibers are attempted to be formed into a bar-like intermediate product by drawing the carbon fibers through a pipe-shaped mould, but since the resin can not flow between the fibers, the drawing of the fibers through the pipe-shaped mould encounter difficulty because the resin has a high viscosity. And the resin-impregnated carbon fibers require heating thereof at a high temperature (150°–180° C.) for a long time (1–2 hours). Thus, the manufacture of the hollow glass-phenol fishing rod and polyester-impregnated fishing rod has encountered difficulty.

SUMMARY OF THE INVENTION

Therefore, the object of the present invention is to provide a novel and improved method for manufacturing a resin-reinforced carbon fiber bar product which can effectively eliminate the difficulties inherent in the prior art methods for manufacturing resin-impregnated bar products.

The above and other objects and attendant advantages of the present invention will be now described referring to the accompanying drawing which shows one example of the present invention for illustration purpose only, but not for limiting the scope of the same in any way.

BRIEF DESCRIPTION OF THE DRAWING

FIG. 1 is an elevational view in partial section of an apparatus which is employed for carrying out the method of the present invention;

FIG. 2 is a perspective view of an intermediate plastic bar product in a midway of the manufacture of a resin-reinforced carbon fiber bar product according to the present invention;

FIG. 3 is a perspective view which shows the manner in which a tape of cellophane is wound about the intermediate plastic bar product; and FIG. 4 is a view showing the final heating step of the carbon fiber-reinforced plastic bar in the method of the present invention.

PREFERRED EMBODIMENT OF THE INVENTION

The present invention will be now described referring to the accompanying drawing. The method of the present invention generally comprises the following steps as will be in detail described hereinbelow. In the first step, long carbon fibers are orientated longitudinally and impregnated with thermal setting resin such as epoxy resin or phenol resin dissolved in a solvent such as methyl ketone or methyl alcohol, and the resin-impregnated carbon fibers are heated at a temperature within the range 40°–200° C. for a time period sufficient to evaporate the solvent. In this step, the heating temperature and time vary depending upon the condition or type of the resin employed. When a fresh epoxy resin is employed, the resin-impregnated carbon fibers are heated at 100° C. for about 15 minutes or at 50° C. for about 2 hours. When an old epoxy resin (the solvent has evaporated therefrom) is employed, such heating may be eliminated. On the other hand, when the carbon fibers are impregnated with phenol resin, the resin-impregnated carbon fibers are heated at 100° C. for 10 minutes or at 50° C. for 1 hour. After the heating, the resin-impregnated carbon fibers are allowed to cool to room temperature (15°–35° C.) whereupon the carbon fibers set to a soft semi-folid state to provide an intermediate carbon fiber bundle.

The resin-impregnated carbon fiber bundle is introduced into a heating device as shown in FIG. 1. As seen in this Figure, the heating device is generally shown by reference numeral 10 and comprises a vertically extending cylindrical body 11 having aligned holes 12 and 13 in the bottom and top walls thereof. The hole 12 is an inlet hole through which the carbon fiber bundle is introduced into the cylindrical body 11 and the hole 13 is an outlet through which the carbon bundle is taken out of the cylindrical body after the same has been heat-treated. A heating coil 14 surrounds the cylindrical body 11 and is electrically connected through a line to a switch 15 which is in turn electrically connected to a power source 16. A thermostatic 17 is provided within the cylindrical body 11 and electrically connected to the power source through a line for maintaining the cylindrical body 11 at a constant temperature. A manual adjusting device 17' is provided for adjusting the setting of the thermostat 17. A lower silicone rubber sheet 18 is mounted on a lateral extension of the top wall of the cylindrical body 11 in parallel to the top wall by a suitable means and a similar upper silicone rubber sheet 19 is provided above the lower silicone rubber sheet 18 in parallel and spaced to the lower silicone rubber sheet. The lower and upper silicone rubber sheets 18, 19 have alinged holes the diameter of which is smaller than that of an intermediate carbon fiber bar product emerging from the cylindrical body 11 for the purpose to be described hereinafter. A cooling fan 20 is mounted on the lateral extension of the top wall of the cylindrical body 11 for cooling the carbon fiber bundle C when the carbon fiber bundle emerges from the hole in the top wall of the cylindrical body 11 as the intermediate carbon fiber product.

When the resin-impregnated carbon fiber bundle C is introduced into the heating device 10 or more particularly, into the cylindrical body 11 thereof via the hole in the bottom wall of the cylindrical body, the switch 15 is turned on to energize the heating coil 14 which in turn heats the carbon fiber bundle C to a temperature within 100°–180° C. through the wall of the cylindrical body 11 to soften the carbon fiber bundle. The moving carbon fiber bundle C is passed through the cylindrical body 11 at a rate to allow the resin impregnated in the carbon fibers to set to a semisolid state. The rate at which the carbon fiber bundle C is passed through the cylindrical body 11 varies depending upon the type of the resin employed and/or the length of the cylindrical body 11. In the example shown, the carbon fiber bundle is passed at a rate within the range 2 to 10 cm/sec. through the cylindrical body 11 having a length within the range 50 to 100 cm by means of a means as will be described hereinabove.

The thus treated carbon fiber bundle is taken out of the cylindrical body 11 and passed through the holes in the lower and upper silicone rubber sheets 18 and 19. The diameter of the holes in the lower and upper silicone rubber 18, 19 is so selected that as the carbon fiber bundle passes through the holes in the silicone rubber sheets, the inherent resilient compression force provided by the material of the silicon rubber sheets compresses the carbon fibers together to form a bar-like intermediate product. Thus, it will be understood that the holes in the top and bottom walls of the cylindrical body 11 do not act to squeeze the resin from the carbon fibers. To accelerate the pulling of the treated carbon fiber bundle C out of the heat device 10, a ring-shaped holder 21 is attached at one end to the leading end of the carbon fiber bundle C through a wire of length sufficient to position the leading end of the carbon fiber bundle above the upper silicone rubber sheet 19 when the resin-impregnated carbon fibers are initially introduced into the heating device 10. The ring-shaped holder is connected at the other end to a chain 22 which is in turn secured to a suitable pulling means (not shown).

Since the carbon fibers tend to separate from each when the carbon fiber bundle is left as it is after the carbon fiber bundle has passed through the silicone rubber sheets 18, 19, as soon as the carbon fiber bundle C emerges from the holes in the lower and upper silicone rubber sheets, the cooling fan 20 is operated to quench the carbon fiber bundle C to room temperature. The resin impregnated in the carbon fibers assumes a semi-solid state at room temperature to thereby form the carbon fiber bundle to a solid bar having a high mechanical strength sufficient to stand against the force which will be applied to the carbon fiber bundle when a tape of cellophane is wound about the carbon fiber bundle and the carbon fiber bundle is subjected to further treatment steps as will be described hereinafter.

The thus treated continuous length of carbon fiber bundle C is cut to intermediate bar products having a desired or predetermined length (one of the intermediate bar product is shown by reference character C' in FIG. 2). The intermediate bar product C' is then subjected to the next step in which a tape T of cellophane is wound about the intermediate bar product in a spiral pattern. The cellophane tape has been previously impregnated with water in the amount of 20–45% by weight based on the weight of the bar product. Thereafter, as the water content in the cellophane tape evaporates, the tape contracts to apply compression force to the carbon fibers peripherally. By the application of the peripheral compression force to the carbon fiber bundle, the intermediate bar product C' becomes to have a substantially true circular cross-section configuration. The intermediate bar product comprising the carbon fiber bundle and cellophane tape is then placed into a heating oven which is shown by phantasm lines 30 in FIG. 4. In the heating oven, the intermediate bar product is held at the opposite ends by means of holders 31, 32 (the holder 31 is supported on a suitable means such as a pin 34 secured to the heating oven) and hung from the holder 31 by placing a weight 33 on the holder 32 or the holders 31 and 32 are pulled away from each by suitable means to thereby tension the intermediate bar product C' in the longitudinal direction or the lateral direction to prevent the intermediate bar product from bending. The intermediate bar product is heated to a temperature within the range 150°–180° C. being maintained in the tensioned condition in the heating oven 30 to perfectly set the resin. When the intermediate carbon fabric bar product is heated in the manner mentioned just above, the cellophane tape wound about the intermediate bar product dries and contracts to further tighten the carbon fiber bundle to give a substantial true circle cross-section configuration to the intermediate bar product whereby the carbon fibers compress together resulting in obtaining a high quality of carbon fiber bar product. After the complete carbon fiber product has been obtained in this manner, the cellophane tape is removed from the complete carbon fiber bar product to thereby provide a carbon fiber-reinforced plastic bar product.

In the foregoing embodiment, although description has been made of the instance in which carbon fibers are employed as the principal material of the resin reinforced carbon fiber plastic product, the carbon fibers may be replaced by glass fibers or asbestos fibers.

As mentioned hereinabove, according to the present invention, since the bar-like product comprising carbon fibers and a thermal setting resin such as epoxy resin impregnated therein is capable of being semi-hardened to the degree that the bar-like product becomes a solid state at room temperature, the cellophane tape can be easily and orderly wound about the carbon fiber bundle.

Thus, according to the present invention, the disorder or deformation of internal honeycombs which may occur when the cellophane tape is wound about the carbon fibers as seen in the manufacture of the prior art resin reinforced carbon fiber bar product can be eliminated. As a result, the obtained resin-reinforced carbon fiber bar product can be simply finished after the cellophane tape has been removed from the obtained resin-reinforced carbon fabric products. Thus, the present invention has the advantage that the material consumption amount can be reduced to a minimum and the finishing operation can be performed in a short time.

While a only one embodiment of the invention has been shown and described in detail, it will be understood that the same is for illustration purpose only and not to be taken as a definition of the invention, reference being had for this purpose to the appended claims.

What is claimed is:

1. A method for manufacturing a resin-reinforced carbon fabric bar product which comprises the steps of heating a thermal setting resin-impregnated carbon fabric bundle to a temperature sufficient to set said thermal setting resin to a semi-solid state, drawing said carbon fabric bundle through resilient constriction means to compress the carbon fibers in said carbon fabric bundle together to form an intermediate bar product, cooling said intermediate bar product to room temperature, winding a tape of water-containing cellophane about said intermediate bar product in a spiral manner to further tighten said carbon fibers in the carbon fiber bundle together, tensioning said carbon fiber bundle in the longitudinal direction of the bundle while heating the carbon fiber bundle until the resin impregnated in the carbon fabric bundle is completely set and removing said cellophane tape from said carbon fabric bundle.

2. The method as set forth in claim 1, in which said heating of the thermo-setting resin to a semi-solid state is carried out at a temperature within the range 40°–200° C.

3. The method as set forth in claim 1, in which said thermo-setting resin is epoxy resin.

4. The method as set forth in claim 1, in which said thermo-setting resin is polyester resin.

5. The method as set forth in claim 1, in which said resilient constriction means comprises a pair of upper and lower silicone rubber sheets disposed in parallel and horizontal orientation and having aligned holes the diameter of which is smaller than the diameter of said intermediate bar product.

6. The method as set forth in claim 1, in which said cooling of the intermediate bar product is carried out to room temperature.

7. The method as set forth in claim 1, in which said room temperature is within the range 15°–35° C.

8. The method as set forth in claim 1, in which said final heating of the resin impregnated in the intermediate carbon fabric product is performed at a temperature within the range 120°–180° C.

9. The method as set forth in claim 1, in which said heating of the carbon fiber bundle to set the resin impregnated in the carbon fibers of the carbon fiber bundle to a semi-solid state is carried out while the carbon fiber bundle is moving at a rate within the range 2 to 10 cm per second.

10. The method as set forth in claim 1, in which said stretching of the carbon fiber bundle is carried out by attachning holders to the opposite ends of the carbon fiber bundle, securing one of said holders to a support means and attaching a weight to the other holder.

11. The method as set forth in claim 1, in which said stretching of the carbon fiber bundle is carried out by attaching holders to the opposite ends of the carbon fiber bundle and pulling said holders away from each other.

* * * * *